(12) United States Patent
Huang et al.

(10) Patent No.: US 10,685,434 B2
(45) Date of Patent: Jun. 16, 2020

(54) METHOD FOR ASSESSING AESTHETIC QUALITY OF NATURAL IMAGE BASED ON MULTI-TASK DEEP LEARNING

(71) Applicant: Institute of Automation, Chinese Academy of Sciences, Beijing (CN)

(72) Inventors: Kaiqi Huang, Beijing (CN); Tieniu Tan, Beijing (CN); Ran He, Beijing (CN); Yueying Kao, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 164 days.

(21) Appl. No.: 16/068,912

(22) PCT Filed: Mar. 30, 2016

(86) PCT No.: PCT/CN2016/077910
§ 371 (c)(1),
(2) Date: Jul. 10, 2018

(87) PCT Pub. No.: WO2017/166137
PCT Pub. Date: Oct. 5, 2017

(65) Prior Publication Data
US 2019/0026884 A1   Jan. 24, 2019

(51) Int. Cl.
*G06T 7/00* (2017.01)
*G06N 7/00* (2006.01)
*G06K 9/00* (2006.01)
*G06N 3/04* (2006.01)
*G06N 3/08* (2006.01)
(Continued)

(52) U.S. Cl.
CPC ........ *G06T 7/0002* (2013.01); *G06K 9/00664* (2013.01); *G06K 9/6262* (2013.01);
(Continued)

(58) Field of Classification Search
CPC ........ G06T 7/0002; G06T 2207/20084; G06T 2207/20076; G06T 2207/20081;
(Continued)

(56) References Cited

U.S. PATENT DOCUMENTS

2007/0297675 A1   12/2007   Lee
2012/0269441 A1*  10/2012   Marchesotti .......... G06T 7/0002
                                                                 382/195
(Continued)

FOREIGN PATENT DOCUMENTS

CN   103714351 A   4/2014
CN   103823845 A   5/2014
(Continued)

OTHER PUBLICATIONS

Liu, "Representation learning using multi-task deep neural networks for semantic classification and information retrieval," Proc. NAACL, Jun. 5, 2015 (Year 2015).*
(Continued)

*Primary Examiner* — Juan A Torres
(74) *Attorney, Agent, or Firm* — Maier & Maier, PLLC

(57) ABSTRACT

The present application discloses a method for assessing aesthetic quality of a natural image based on multi-task deep learning. Said method includes: step 1: automatically learning aesthetic and semantic characteristics of the natural image based on multi-task deep learning; step 2: performing aesthetic categorization and semantic recognition to the results of automatic learning based on multi-task deep learning, thereby realizing assessment of aesthetic quality of the natural image. The present application uses semantic information to assist learning of expressions of aesthetic characteristics so as to assess aesthetic quality more effectively, besides, the present application designs various multi-task deep learning network structures so as to effectively use the aesthetic and semantic information for obtaining highly accurate image aesthetic categorization. The present application can be applied to many fields relating to image aesthetic quality assessment, including image retrieval, photography and album management, etc.

5 Claims, 5 Drawing Sheets

Automatically learning aesthetic and semantic characteristics of the natural image based on multi-task deep learning — S101

Performing aesthetic categorization and semantic recognition to the results of automatic learning based on multi-task deep learning, thereby realizing assessment of aesthetic quality of the natural image — S102

(51) Int. Cl.
*G06K 9/62* (2006.01)
*H04N 17/00* (2006.01)

(52) U.S. Cl.
CPC ......... *G06K 9/6278* (2013.01); *G06N 3/0454* (2013.01); *G06N 3/0472* (2013.01); *G06N 3/084* (2013.01); *G06N 7/005* (2013.01); *G06K 9/6267* (2013.01); *G06T 2207/20076* (2013.01); *G06T 2207/20081* (2013.01); *G06T 2207/20084* (2013.01); *G06T 2207/30168* (2013.01); *H04N 17/00* (2013.01)

(58) Field of Classification Search
CPC ......... G06T 2207/30168; G06N 7/005; G06N 3/0454; G06N 3/0472; G06N 3/084; G06K 9/00664; G06K 9/6262; G06K 9/6278; G06K 9/6267; H04N 17/00
USPC ....................................................... 382/112
See application file for complete search history.

(56) References Cited

U.S. PATENT DOCUMENTS

| | | | |
|---|---|---|---|
| 2013/0188866 A1* | 7/2013 | Obrador | G06T 7/0002 382/165 |
| 2015/0055854 A1* | 2/2015 | Marchesotti | G06K 9/627 382/159 |
| 2015/0347820 A1 | 12/2015 | Yin et al. | |

FOREIGN PATENT DOCUMENTS

| | | |
|---|---|---|
| CN | 104036021 A | 9/2014 |
| CN | 105404877 A | 3/2016 |
| CN | 105894025 A | 8/2016 |

OTHER PUBLICATIONS

W. Liu, "Multi-task deep visual semantic embedding for video thumbnail selection," in Proc. IEEE Conf. Comput. Vis. Pattern Recognit., 2015 pp. 3707-3715. (Year 2015).*

Zhang, "Actively learning human gaze shifting paths for semantics-aware photo cropping," IEEE Trans. Image Process., vol. 23, No. 5, May 2014, pp. 2235-2245.(Year 2014).*

Kao, "Deep aesthetic quality assessment with semantic information." IEEE Transactions on Image Processing 26.3 Oct. 21, 2016. (Year 2016).*

Kao, "Visual aesthetic quality assessment with multi-task deep learning." Apr. 18, 2016. (Year 2016).*

International Search Report dated Dec. 26, 2016 of corresponding International Application No. PCT/CN2016/077910; 7 pgs.

* cited by examiner

METHOD FOR ASSESSING AESTHETIC QUALITY OF NATURAL IMAGE BASED ON MULTI-TASK DEEP LEARNING

TECHNICAL FIELD

The present application relates to technical fields of mode recognition, machine learning and computer vision, in particular to a method for assessing aesthetic quality of a natural image based on multi-task deep learning.

BACKGROUND

With the rapid development of digital media technology and computer technology, demands and expectations on such fields as computer vision, artificial intelligence and machine perception have become higher and higher. People not only want computers to recognize objects in images and provide precise locations of the objects, which are typical computer vision problems, but also expect computers to have a higher level of perceptual capability like the human visual system. Image aesthetic analysis, especially image aesthetic quality assessment, has gained more and more attention currently. Image aesthetic quality assessment is to use a computer to perform intelligent analysis so as to determine the aesthetic quality of an image. A conventional method for image aesthetic quality assessment only takes the image aesthetic quality assessment as an isolated task and manually designs characteristics or uses characteristics from deep network learning to assess the quality. All these features are affected by the subjective factor of aesthetic and the precision can hardly meet the user's requirement, either.

For the human visual system, image aesthetic quality assessment can hardly be considered as an independent task, but it is usually accompanied by some other visual perception tasks. For example, when people are going to assess the aesthetic quality of an image, they must have comprehended the content of the image, namely, they can tell the semantic information of what they are looking at. Meanwhile, the multi-task learning can enable learning of several relevant tasks simultaneously, and lots of researches have proved that multi-task learning can improve effects of some or all tasks.

In view of this, the present application is proposed.

SUMMARY

The present application provides a method for assessing aesthetic quality of a natural image based on multi-task deep learning to improve robustness and precision of assessment of aesthetic quality of a natural image.

To achieve the above-mentioned object, the following technical solutions are provided:

A method for assessing aesthetic quality of a natural image based on multi-task deep learning, which comprises:

step 1: automatically learning aesthetic and semantic characteristics of the natural image based on multi-task deep learning;

step 2: performing aesthetic categorization and semantic recognition to the results of automatic learning based on multi-task deep learning, thereby realizing assessment of aesthetic quality of the natural image.

Starting with finding out more effective aesthetic characteristics by means of multi-task learning, the present application proposes a method for using semantic information in assisting aesthetic quality assessment based on multi-task deep learning, which well makes up for the inadequacy in aesthetic characteristics expression and obtains a more robust and more precise aesthetic quality assessment result. The present application can also be applied to many fields relating to image aesthetic quality assessment, including image retrieval, photography and album management, etc.

DETAILED DESCRIPTION

In conjunction with the figures and the specific embodiments, the technical problem solved, the technical solution adopted and the technical effects achieved by the embodiments of the present application will be described clearly and completely in the text below. Obviously, the described embodiments are merely some rather than all of the embodiments of the present application. On the basis of the embodiments in the present application, other equivalent or variant embodiments obtained by those ordinarily skilled in the art without using inventive skills shall fall within the protection scope of the present application. The embodiments of the present application can be embodied in various different ways as defined and covered by the claims.

It shall be noted that the embodiments of the present application as well as the technical features thereof can be combined to form technical solutions as long as they do not conflict with each other.

The key points of the concept of the embodiments of the present application are as follows: 1) the embodiments of the present application propose that semantic information recognition is a task relevant to aesthetic assessment, which assists in learning effective expressions of image aesthetic characteristics; 2) the aesthetic quality assessment method based on multi-task deep learning as well as the strategy of balancing among tasks proposed by the embodiments of the present application can improve precision and robustness of aesthetic quality assessment by effectively using valid information of all tasks; 3) the method assisted by semantic information and based on multi-task deep learning as proposed by the embodiments of the present application has proved effectiveness of semantic information in the aesthetic quality assessment task, and it has also proved that aesthetic quality assessment is not an isolated task in the human visual system.

Figure 1:
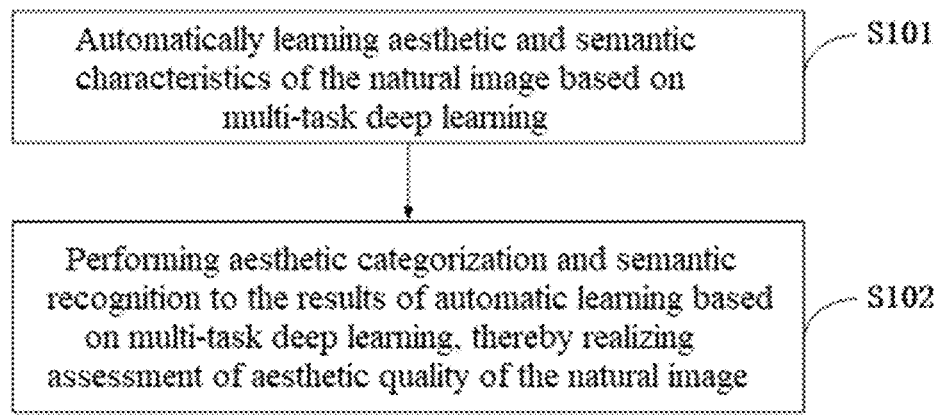
FIG. 1 is a flow chart of a method for assessing aesthetic quality of a natural image based on multi-task deep learning according to an embodiment of the present application.

FIG. 1 is a flow chart of a method for assessing aesthetic quality of a natural image based on multi-task deep learning. As shown in FIG. 1, said method comprises:

S101: automatically learning aesthetic and semantic characteristics of the natural image based on multi-task deep learning;

S102: performing aesthetic categorization and semantic recognition to the results of automatic learning based on multi-task deep learning, thereby realizing assessment of aesthetic quality of the natural image.

The method for using semantic information in assisting aesthetic quality assessment based on multi-task deep learning as described in the embodiment of the present application can well make up for the inadequacy in aesthetic characteristics expression and obtain a more robust and more precise aesthetic quality assessment result.

Now the above method will be described in detail. Said method includes steps S201-S204.

S201: training aesthetic and semantic annotations of data.

Figure 3:
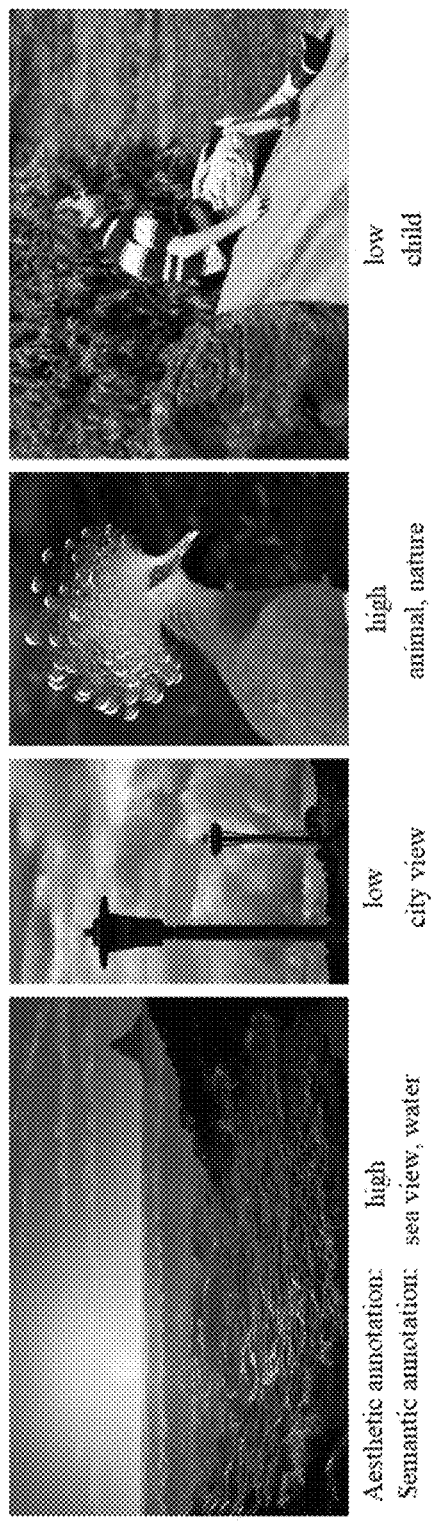
FIG. 3 is a schematic drawing of images with aesthetic annotations and semantic annotations according to an embodiment of the present application.

Large-scale available data is the prerequisite for deep learning. The embodiments of the present application use large-scale data sets having both aesthetic and semantic labels. Aesthetic is a very subjective property and it varies from individual to individual, so as for the annotation for aesthetic, usually an image is annotated by many people and then an average annotation of all people are used as a final label for the image. While semantics is an objective property, so the labels are somewhat consistent. FIG. 3 shows example images having aesthetic and semantic annotations, wherein high means high aesthetic quality and low means low aesthetic quality.

S202: pre-processing the image.

Wherein a pre-processing is needed before training all annotated images using a deep learning neural network. First, images are normalized to a uniform size (such as 256×256), then a mean value of all images is subtracted from the images (so as to eliminate influences from light, etc.), finally, during each training, an area of a fixed size (such as 227×227) is cut out randomly from the images to send to the deep learning neural network. The strategy of randomly cutting out areas from the images can increase training samples. Wherein a mean value of all images refers to a result obtained by averaging RGB values on each pixel of all images that have been normalized to a uniform size.

S203: performing characteristic learning and model training based on multi-task deep learning.

In this step, characteristic learning and model training based on multi-task deep learning is realized by a deep convolutional neural network. The present application proposes to use the semantic information to assist the aesthetic quality assessment task and models this problem as a multi-task deep learning probability model.

X represents a pre-processed image, Y represents an aesthetic category marker corresponding to the image, Z represents a semantic information marker corresponding to the image, $\theta$ represents a parameter that the aesthetic categorization task and the semantic recognition task have in common in the bottom layer of the multi-task deep learning network, W represents respective parameters for the aesthetic categorization task and the semantic recognition task in a higher layer of the multi-task deep learning network, $W=[W_a, W_s]$, $W_a$ represents a parameter specific to the aesthetic categorization task in the multi-task deep learning network, and $W_s$ represents a parameter specific to the semantic recognition task in the multi-task deep learning network.

The object is to seek and obtain optimal estimates $\hat{\theta}, \hat{W}, \hat{\lambda}$ for $\theta, W, \lambda$ so as to maximize the posterior probability.

The objective function is as follows:

$$\hat{\theta}, \hat{W}, \hat{\lambda} = \underset{\theta, W, \lambda}{\operatorname{argmax}} p(\theta, W, \lambda \mid X, Y, Z) \quad (1)$$

Wherein, $\lambda$ represents a weight coefficient of semantic recognition in the joint learning. $p(\theta, W, \lambda \mid X, Y, Z)$ represents the posterior probability.

According to the Bayesian theory, the posterior probability $p(\theta, W, \lambda \mid X, Y, Z)$ in equation (1) can be transformed into the following equation:

$$p(\theta, W, \lambda \mid X, Y, Z) \propto p(Y \mid X, \theta, W_a) p(Z \mid X, \theta, W_s, \lambda) p(\theta) p(W) p(\lambda) \quad (2)$$

Wherein, $p(Y \mid X, \theta, W_a)$ represents a conditional probability of a corresponding aesthetic categorization task, $p(Z \mid X, \theta, W_s, \lambda)$ represents a conditional probability of a corresponding semantic recognition task, $p(\theta)$, $p(W)$ and $p(\lambda)$ are prior probabilities, respectively.

Each term in equation (2) will be introduced below by means of examples.

1) Conditional probability $p(Y \mid X, \theta, W_a)$

The conditional probability of an aesthetic categorization task is solved in a multi-task deep leaning network by means of the following equation:

$$p(Y \mid X, \theta, W_a) = \prod_{n=1}^{N} \sum_{c=1}^{C} 1\{y_n = c\} p(y_n = c \mid x_n, \theta, W_a) \quad (3)$$

Wherein, N represents the number of all training samples, n represents the $n^{th}$ sample, n=1, 2, ... N, C represents the number of categories of aesthetic quality, c represents the $c^{th}$ category, c=1, 2, ... C, $1\{\bullet\}$ is an indicator function, when it is true, the value is 1, when it is false, the value is 0, $y_n$ represents the aesthetic category marker of the $n^{th}$ sample. $x_n$ represents the image data of the $n^{th}$ sample.

The conditional probability $p(y_n = c \mid x_n, \theta, W_a)$ of the $n^{th}$ sample is obtained by a softmax function in the multi-task deep learning network, i.e.

$$p(y_n = c \mid x_n, \theta, W_a) = \frac{\exp(W_a^{cT}(\theta^T x_n))}{\sum_{l=1}^{C} \exp(W_a^{lT}(\theta^T x_n))} \quad (4)$$

Wherein, l represents the $l^{th}$ category, l=1, 2, ... C, $W_a^c$ represents a network parameter corresponding to the $c^{th}$ aesthetic category, $W_a^{cT}$ and $\theta^T$ respectively refer to transposition of $W_a^c$ and $\theta$.

2) Conditional Probability $p(Z \mid X, \theta, W_s, \lambda)$

The conditional probability of the semantic recognition task is solved in a multi-task deep learning network by means of the following equation:

$$p(Z \mid X, \theta, W_s, \lambda) = \prod_{n=1}^{N} \prod_{m=1}^{M} \left( p(z_n^m = 1 \mid x_n, \theta, W_s^m)^{z_n^m} (1 - p(z_n^m = 1 \mid x_n, \theta, W_s^m))^{1 - z_n^m} \right)^{\lambda} \quad (5)$$

Wherein, M represents the number of all semantic attributes, m represents the $m^{th}$ semantic attribute, m=1, 2, ... M, $z_n^m$ represents the marker of the $m^{th}$ semantic attribute of the $n^{th}$ sample, whose value is 0 or 1. $W_s^m$ represents a network parameter corresponding to the $m^{th}$ semantic attribute.

The conditional probability $p(z_n^m=1|x_n,\theta,W_s^m)$ of the $n^{th}$ sample is obtained by a Sigmoid function $\sigma(x)=1/(1+\exp(-x))$ (wherein) in a multi-task deep learning network.

3) Prior Probabilities p(θ), p(W) and p(λ)

Like common convolutional neural networks, the present application initializes parameters θ,W into standard normal distribution respectively, and initializes parameter λ into a normal distribution having a mean value μ and a variance $\sigma^2$.

Finally, the equation of each term in equation (2) is substituted into equation (2), the negative logarithm is taken and the constant term is omitted, so that a final objective function is obtained:

$$\operatorname*{argmin}_{\theta, W, \lambda}\left\{-\sum_{n=1}^{N}\sum_{c=1}^{C}1\{y_n=c\}\log\frac{\exp(W_a^{cT}(\theta^T x_n))}{\sum_{l=1}^{C}\exp(W_a^{lT}(\theta^T x_n))}-\right. \tag{6}$$

$$\lambda\sum_{n=1}^{N}\sum_{m=1}^{M}(z_n^m\log\sigma(W_s^{mT}(\theta^T x_n))+(1-z_n^m)(1-\log\sigma(W_s^{mT}(\theta^T x_n))))+$$

$$\left.\theta^T\theta+W^TW+(\lambda-\mu)^2\right\}$$

In order to more effectively learn expressions of the aesthetic characteristics, the present application proposes a strategy of balancing between two tasks in the objective function (equation (6)), which is realized by $$\lambda=\frac{1}{M}.$$

The first term in equation (6) is a substitution from equation (4), which corresponds to the aesthetic assessment task and is realized by the softmax function, while the softmax function is characterized by calculating losses of only the correctly categorized category for each sample. The second term in equation (6) is a substitution from equation (5), which corresponds to the semantic recognition task. Since each sample has M semantic annotations, and the task of recognizing each semantics is performed by the sigmoid function, M losses need to be calculated for each sample.

In order to balance losses of the two tasks during optimization of the objective function, $$\lambda=\frac{1}{M}.$$

Figure 2:
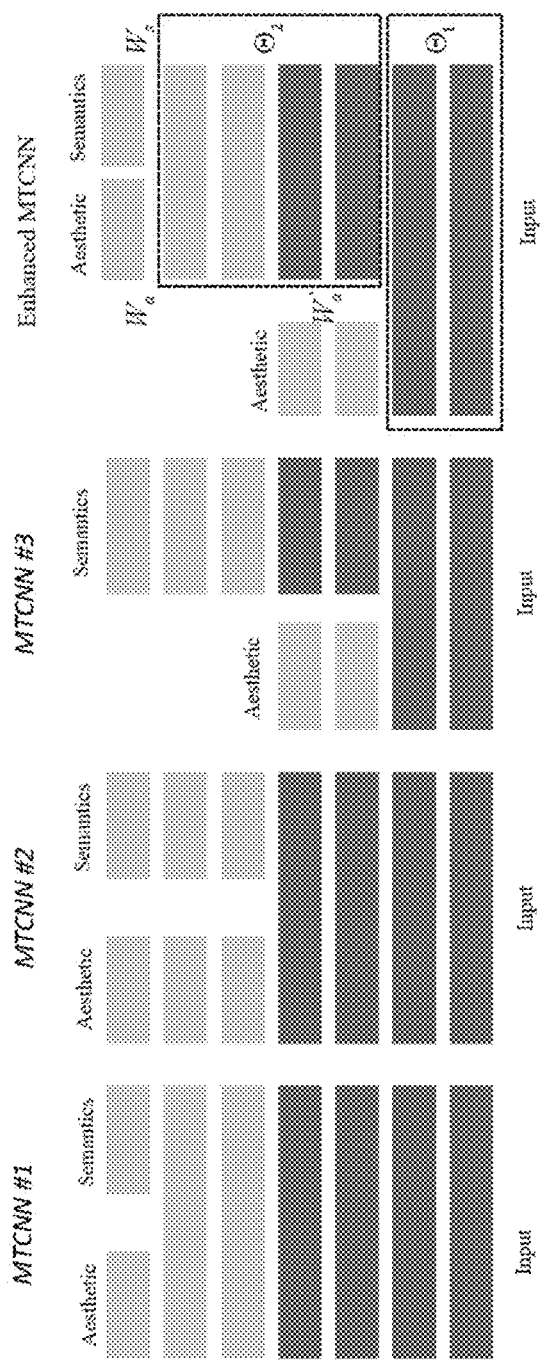
FIG. 2 is a structural diagram of four specific implementations of a multi-task deep convolutional neural network according to an embodiment of the present application.

Said optimization of the objective function can be realized by various multi-task convolutional neural network structures, as shown in FIG. 2. FIG. 2 shows four implementable multi-task convolutional neural networks (MTCNN #1 to MTCNN #3 and enhanced MTCNN), wherein MTCNN is an abbreviation for multi-task convolutional neural network. The dark grey color indicates the convolutional layer and the light grey color indicates the fully connected layer. MTCNN #1 contains 4 convolutional layers and 2 fully connected layers shared by the aesthetic and semantic tasks, as well as one fully connected layer for each of the two tasks, respectively; MTCNN #2 contains 4 convolutional layers shared by the aesthetic and semantic tasks, as well as 3 fully connected layers for each of the two tasks, respectively; MTCNN #3 contains 2 convolutional layers shared by the aesthetic and semantic tasks, 2 fully connected layers for only the aesthetic task, as well as 2 convolutional layers and 3 fully connected layers for only the semantic task; the enhanced MTCNN contains 2 convolutional layers shared by the aesthetic and semantic tasks, 2 fully connected layers for one aesthetic task, 2 convolutional layer and 2 fully connected layers shared by another aesthetic task and the semantic task, as well as one fully connected layer for the aesthetic task and the semantic task, respectively. The objective function (equation (6)) is optimized by using the first kind of network MTCNN #1 in FIG. 2 as an example. The 4 convolutional layers and 2 fully connected layers contained therein from bottom to top include parameters shared by the two tasks, wherein the parameters are indicated by θ, the 2 fully connected layers on the top from left to right represent parameters specific to aesthetic and parameters specific to semantics, and the parameters specific to aesthetic and the parameters specific to semantics are respectively indicated by $W_a$ and $W_s$. Training of this network is realized through a back propagation algorithm.

S204: inputting test images into a trained network for aesthetic quality prediction.

Figure 4A:
FIG. 4a is a schematic drawing of correctly categorized high-quality aesthetic images among results of assessment of aesthetic quality of natural images based on multi-task deep learning according to an embodiment of the present application.
Figure 4B:
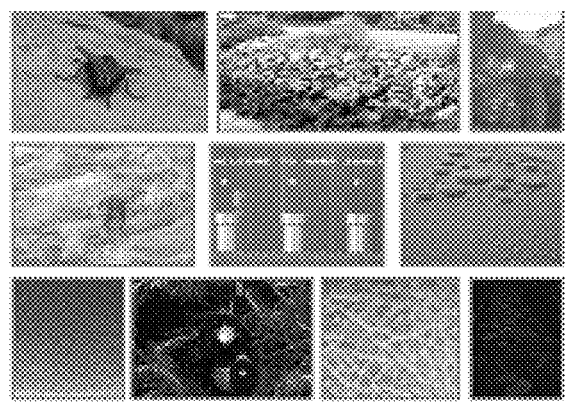
FIG. 4b is a schematic drawing of correctly categorized low-quality aesthetic images among results of assessment of aesthetic quality of natural images based on multi-task deep learning according to an embodiment of the present application.

During testing, test images are input into the neural network trained in the last step, and finally the aesthetic quality prediction and semantic category prediction are output. Since semantic recognition is merely an auxiliary task, attention is paid only to the result of aesthetic quality assessment during testing. FIG. 4a shows that the tests are images of high aesthetic quality, and FIG. 4b shows that the tests are images of low aesthetic quality.

Figure 5:
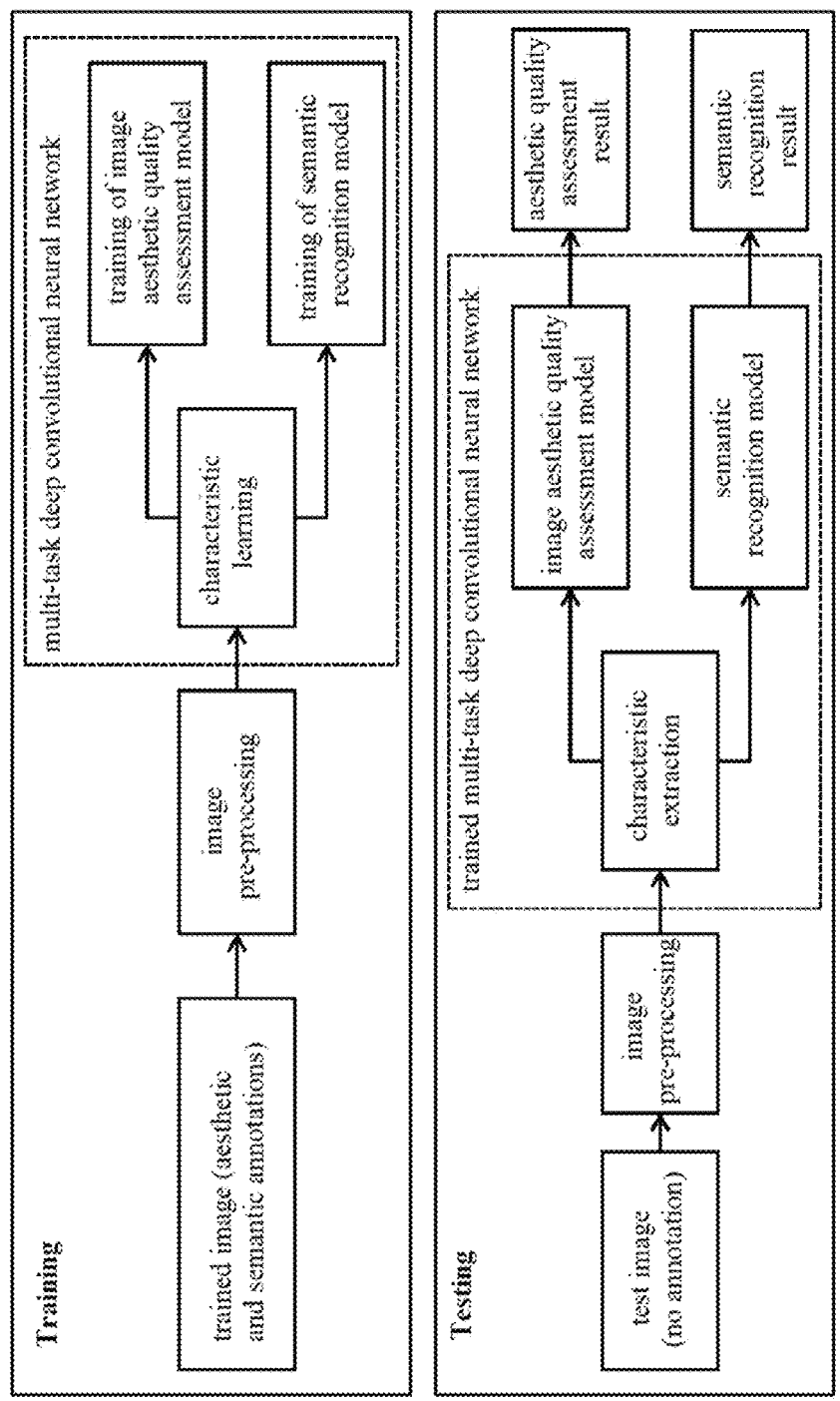
FIG. 5 is a flow chart of the training and testing stages of a method for assessing aesthetic quality of a natural image based on multi-task deep learning according to an embodiment of the present application.

FIG. 5 is a flow chart of the training and testing stages according to an embodiment of the present application. As shown in FIG. 5, in the training stage, aesthetic and semantic annotations are made first to the trained images, then images are pre-processed, finally the pre-processed images are input into a multi-task deep convolutional neural network for characteristic learning and model training; in the testing stage, the test images are not annotated, and the images are pre-processed, then the pre-processed test images are input into the multi-task deep convolutional neural network that has been trained in the training stage for characteristic extraction, aesthetic quality assessment and semantic recognition, finally results are output.

The present application will be further described below by a preferred embodiment.

Step S301: collecting training data and making aesthetic and semantic annotations for each image.

Step S302: pre-processing images.

Specifically, all of the images are normalized to a uniform size, such as 256×256, then a mean value image is subtracted from the images (the mean value image refers to a result obtained by averaging RGB values on each pixel of all images that have been normalized to a uniform size), then an image area of a fixed size (such as 227×227) is cut out randomly to send to the neural network to be trained.

Step S303: performing characteristic learning and model training based on the multi-task deep learning, sending the pre-processed images to the pre-defined convolutional neural network.

Step S304: inputting test images (as shown in FIG. 4) into a trained network for aesthetic quality prediction.

During the testing, test images are input into the neural network that has been trained in the last step and finally aesthetic quality prediction is output.

In summary, the embodiments of the present application provide a new method for assessing aesthetic quality of a natural image using semantic information and based on multi-task deep learning. The embodiments of the present application make good use of semantic information to assist learning of expressions of aesthetic characteristics and to obtain more robust and precise aesthetic quality assessment performance, thus proving effectiveness of semantic information for aesthetic characteristic learning.

The above described are only specific embodiments of the present application, but the protection scope of the present application are not limited to these. Any variations or substitutions conceived by those skilled in the art under the technical scope disclosed by the present application shall fall within the protection scope of the present application. Therefore, the protection scope of the present application is intended to be defined by the protection scope of the claims.

What is claimed is:

1. A method for assessing aesthetic quality of a natural image based on multi-task deep learning, comprising:
    step 1: automatically learning aesthetic and semantic characteristics of a natural image based on multi-task deep learning;
step 2: performing aesthetic categorization and semantic recognition to results of automatic learning based on multi-task deep learning, thereby realizing assessment of aesthetic quality of the natural image,
wherein step 1 includes: automatically learning aesthetic characteristics by using the semantic information of the natural image based on multi-task deep learning; and
step 2 includes: performing aesthetic categorization and semantic recognition to the natural image based on multi-task deep learning by using the first equation:

$$\hat{\theta}, \hat{W}, \hat{\lambda} = \underset{\theta, W, \lambda}{\operatorname{argmax}} p(\theta, W, \lambda \mid X, Y, Z)$$

wherein, X represents the natural image; Y represents an aesthetic category marker corresponding to the image; Z represents a semantic information marker corresponding to the image; $\theta$ represents a parameter that the aesthetic categorization task and the semantic recognition task have in common in the bottom layer of the multi-task deep learning network; W represents respective parameters for the aesthetic categorization task and the semantic recognition task in a higher layer of the multi-task deep learning network, $W=[W_a, W_s]$; $W_a$ represents a parameter specific to the aesthetic categorization task in the multi-task deep learning network; $W_s$ represents a parameter specific to the semantic recognition task in the multi-task deep learning network; $\lambda$ represents a weight coefficient of the semantic recognition task in the joint learning; $p(\theta, W, \lambda \mid X, Y, Z)$ represents the posterior probability.

2. The method according to claim 1, further comprising:
    transforming the first equation into the following second equation according to Bayesian theory:

$$p(\theta, W, \lambda \mid X, Y, Z) \propto p(Y \mid X, \theta, W_a) p(Z \mid X, \theta, W_s, \lambda) p(\theta) p(W) p(\lambda)$$

wherein, $p(Y \mid X, \theta, W_a)$ represents a conditional probability of a corresponding aesthetic categorization task, $p(Z \mid X, \theta, W_s, \lambda)$ represents a conditional probability of a corresponding semantic recognition task, $p(\theta)$, $p(W)$ and $p(\lambda)$ are prior probabilities, respectively.

3. The method according to claim 1, further comprising:
    optimizing the first equation by means of:

$$\lambda = \frac{1}{M}$$

wherein M represents the number of categories of semantic annotations.

4. The method according to claim 2, wherein the conditional probability of said aesthetic categorization task is solved by equation:

$$p(Y \mid X, \theta, W_a) = \prod_{n=1}^{N} \sum_{c=1}^{C} 1\{y_n = c\} p(y_n = c \mid x_n, \theta, W_a)$$

wherein, N represents the number of all training samples, n represents the $n^{th}$ sample, n=1, 2, ... N, C represents the number of categories of aesthetic quality, c represents the $c^{th}$ category, c=1, 2, ... 0, $1\{\bullet\}$ is an indicator function, when the variable in the braces is true, the value is 1, when it is false, the value is 0, $y_n$ represents the aesthetic category marker of the $n^{th}$ sample; and $x_n$ represents the image data of the $n^{th}$ sample;
    and the conditional probability $p(y_n=c \mid x_n, \theta, W_a)$ of the $n^{th}$ sample is obtained by a softmax function in the multi-task deep learning network.

5. The method according to claim 2, wherein the conditional probability of said semantic recognition task is solved by equation:

$$p(Z \mid X, \theta, W_S, \lambda) = \prod_{n=1}^{N} \prod_{m=1}^{M} \left( p(z_n^m = 1 \mid x_n, \theta, W_s^m)^{z_n^m} (1 - p(z_n^m = 1 \mid x_n, \theta, W_s^m))^{1-z_n^m} \right)^{\lambda}$$

wherein, M represents the number of all semantic attributes; m represents the $m^{th}$ semantic attribute, m=1, 2, ... M; $z_n^m$ represents the marker of the $m^{th}$ semantic attribute of the $n^{th}$ sample, whose value is 0 or 1; and $W_s^m$ represents a network parameter corresponding to the $m^{th}$ semantic attribute;
    and the conditional probability $p(z_n^m=1 \mid x_n, \theta, W_s^m)$ of the $n^{th}$ sample is obtained by a Sigmoid function in a multi-task deep learning network.

* * * * *